(12) United States Patent
Sathyanarayanamurthy et al.

(10) Patent No.: US 11,182,139 B2
(45) Date of Patent: Nov. 23, 2021

(54) SYSTEM AND METHOD FOR PRODUCTION READINESS VERIFICATION AND MONITORING

(71) Applicant: Walmart Apollo, LLC, Bentonville, AR (US)

(72) Inventors: Vijitha Sathyanarayanamurthy, San Jose, CA (US); Vilas Veeraraghavan, Newark, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/246,382

(22) Filed: Jan. 11, 2019

(65) Prior Publication Data

US 2020/0225925 A1 Jul. 16, 2020

(51) Int. Cl.
*G06F 8/61* (2018.01)
*H04L 12/24* (2006.01)
*H04L 29/08* (2006.01)

(52) U.S. Cl.
CPC .......... *G06F 8/61* (2013.01); *H04L 41/5083* (2013.01); *H04L 41/5096* (2013.01);
(Continued)

(58) Field of Classification Search
CPC ... G06F 8/61; H04L 41/5083; H04L 41/5096; H04L 67/1012; H04L 67/34; H04L 67/36
(Continued)

(56) References Cited

U.S. PATENT DOCUMENTS 8,612,599 B2 * 12/2013 Tung .................. G06F 11/3495
709/226
8,645,529 B2 * 2/2014 Doddavula ............. H04L 67/34
709/223
(Continued)

OTHER PUBLICATIONS

Stephanow et al, "Evaluating the performance of continuous test-based cloud service certification", [Online], 2017, pp. 1117-1126, [Retrieved from internet on Feb. 11, 2021], <https://ieeexplore.ieee.org/stamp/stamp.jsp?tp=&arnumber=7973821> (Year: 2017).*
(Continued)

*Primary Examiner* — S. Sough
*Assistant Examiner* — Zengpu Wei
(74) *Attorney, Agent, or Firm* — Duane Morris LLP; Manita Rawat

(57) ABSTRACT

Systems and methods for production readiness verification and monitoring are disclosed. A set of compliance requirements including one or more required-asset identifiers and a set of minimum deployment requirements for each required-asset identifier is received. Each of the one or more required-asset identifiers are associated with a cloud asset required for deployment of a target application. One or more probing messages are generated to determine an availability of each cloud asset associated with the one or more required-asset identifiers, at least one probing response is received from at least one cloud, and the cloud environment is identified as one of compliant or non-compliant for application deployment. The cloud environment is identified as compliant when each cloud asset meets each of minimum deployment requirements and non-compliant when a cloud asset fails to meet one of the minimum deployment requirements. The target application is deployed when the cloud environment is compliant.

17 Claims, 6 Drawing Sheets

(52) U.S. Cl.
CPC .......... *H04L 67/1012* (2013.01); *H04L 67/34* (2013.01); *H04L 67/36* (2013.01)

(58) Field of Classification Search
USPC ........................................................ 717/177
See application file for complete search history.

(56) References Cited

U.S. PATENT DOCUMENTS

| | | | |
|---|---|---|---|
| 8,706,869 B2* | 4/2014 | Campion | G06F 9/5066 709/224 |
| 9,158,590 B2* | 10/2015 | Boss | G06F 9/5061 |
| 9,483,258 B1 | 11/2016 | Labat et al. | |
| 9,888,040 B2* | 2/2018 | Hoy | H04L 67/10 |
| 10,103,937 B1 | 10/2018 | Thompson et al. | |
| 10,411,975 B2* | 9/2019 | Martinez | H04L 41/5054 |
| 10,719,332 B1 | 7/2020 | Dwivedi et al. | |
| 10,754,638 B1 | 8/2020 | Dwivedi et al. | |
| 11,093,227 B1 | 8/2021 | Shteyman et al. | |
| 2006/0200818 A1 | 9/2006 | Oprea et al. | |
| 2012/0089726 A1* | 4/2012 | Doddavula | G06F 9/5072 709/224 |
| 2012/0324070 A1* | 12/2012 | Campion | G06F 9/5066 709/223 |
| 2013/0031551 A1 | 1/2013 | Agarwal et al. | |
| 2013/0042004 A1* | 2/2013 | Boss | G06F 9/5061 709/226 |
| 2013/0060933 A1* | 3/2013 | Tung | G06F 11/30 709/224 |
| 2013/0179876 A1 | 7/2013 | Aliminati | |
| 2013/0219156 A1 | 8/2013 | Sears | |
| 2014/0280961 A1* | 9/2014 | Martinez | H04L 41/5054 709/226 |
| 2014/0373011 A1 | 12/2014 | Anderson et al. | |
| 2016/0036667 A1 | 2/2016 | Kripalani et al. | |
| 2017/0013021 A1* | 1/2017 | Hoy | H04L 67/10 |
| 2017/0024396 A1 | 1/2017 | Adarsh et al. | |
| 2018/0060226 A1* | 3/2018 | Siggers | G06F 11/3692 |
| 2018/0191599 A1 | 7/2018 | Balasubramanian et al. | |
| 2018/0351876 A1* | 12/2018 | Ren | H04L 47/808 |
| 2020/0225924 A1 | 7/2020 | Sathyanarayanamurthy et al. | |

OTHER PUBLICATIONS

Fischer et al, "Towards an Approach for Automatically Checking Compliance Rules in Deployment Models", [Online], 2017, pp. 1-5, [Retrieved from internet on Jul. 12, 2021], <https://www.iaas.uni-stuttgart.de/publications/INPROC-2017-47-Towards-an-Approach-for-Automatically-Checking-Compliance-Rules-in-> (Year: 2017).*

* cited by examiner

SYSTEM AND METHOD FOR PRODUCTION READINESS VERIFICATION AND MONITORING

CROSS-REFERENCE TO RELATED APPLICATIONS

This application is related to U. S. patent application Ser. No. 16/246,305, filed simultaneously on Jan. 11, 2019, which is herein incorporated by reference.

TECHNICAL FIELD

This application relates generally to cloud monitoring and, more particularly, to application monitoring in a hybrid cloud environment.

BACKGROUND

Prior to deployment of an application, a developer must verify and authenticate that the cloud environment is capable of supporting the application. For example, developers must verify the health of the cloud environment, individual clouds with the cloud environment, individual servers within the clouds, and individual instances of supporting applications and services within each server. Such verification is tedious and requires a developer to be knowledgeable about the cloud environments requirements for application deployment.

Such issues are enhanced in hybrid cloud environments (e.g., cloud environments including both public clouds and private clouds). The deployment requirements, structures, permissions, best practices, etc. may be different for public clouds and private clouds and/or amongst public clouds and/or private clouds. A developer that wishes to deploy an application to a hybrid environment must spend time learning the requirements at each cloud management layer (e.g., environment layer, individual cloud layer, individual server layer, etc.) and ensure compliance within each cloud at each cloud management layer. Such verification is time consuming and error prone.

SUMMARY

In various embodiments a system including a computing device is disclosed. The computing device is configured to receive a set of compliance requirements including one or more required-asset identifiers and a set of minimum deployment requirements for each required-asset identifier. Each of the one or more required-asset identifiers are associated with a cloud asset required for deployment of a target application. The computing device is further configured to generate one or more probing messages to determine an availability of each cloud asset associated with the one or more required-asset identifiers within a cloud environment, receive at least one probing response from at least one cloud within the cloud environment, and identify the cloud environment as one of compliant or non-compliant for application deployment. The cloud environment is identified as compliant when each cloud asset meets the set of minimum deployment requirements and non-compliant when at least one cloud asset fails to meet at least one of the set of minimum deployment requirements. The computing device deploys the target application to the cloud environment when the cloud environment is identified as compliant.

In various embodiments a non-transitory computer readable medium having instructions stored thereon is disclosed. The instructions, when executed by a processor cause a device to perform operations including receiving a set of compliance requirements including one or more required-asset identifiers and a set of minimum deployment requirements for each required-asset identifier. Each of the one or more required-asset identifiers are associated with a cloud asset required for deployment of a target application. The instructions further cause the device to perform operations including generating one or more probing messages to determine an availability of each cloud asset associated with the one or more required-asset identifiers within a cloud environment, receiving at least one probing response from at least one cloud within the cloud environment, identifying the cloud environment as one of compliant or non-compliant for application deployment. The cloud environment is identified as compliant when each cloud asset meets the set of minimum deployment requirements and non-compliant when at least one cloud asset fails to meet at least one of the set of minimum deployment requirements. The instructions further cause the device to deploy the target application to the cloud environment when the cloud environment is identified as compliant.

In various embodiments a method is disclosed. The method includes a step of receiving a set of compliance requirements including one or more required-asset identifiers and a set of minimum deployment requirements for each required-asset identifier. Each of the one or more required-asset identifiers are associated with a cloud asset required for deployment of a target application. One or more probing messages is generated to determine an availability of each cloud asset associated with the one or more required-asset identifiers within a cloud environment, at least one probing response is received from at least one cloud within the cloud environment, and the cloud environment is identified as one of compliant or non-compliant for application deployment. The cloud environment is identified as compliant when each cloud asset meets the set of minimum deployment requirements and non-compliant when at least one cloud asset fails to meet at least one of the set of minimum deployment requirements. The target application is deployed to the cloud environment when the cloud environment is identified as compliant.

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In various embodiments, a set of compliance requirements including one or more cloud-specific requirements and status information regarding a status of each of a plurality of clouds within a cloud environment is received. The status information includes availability of one or more servers within each of the plurality of clouds. The status information for each of the plurality of clouds is compared to the one or more cloud-specific requirements and the cloud environment is identified as either compliant or non-compliant. The cloud environment is identified as compliant when each of the one or more cloud-specific requirements are satisfied and non-compliant when at least one of the one or more cloud-specific requirements are not satisfied.

Figure 1:
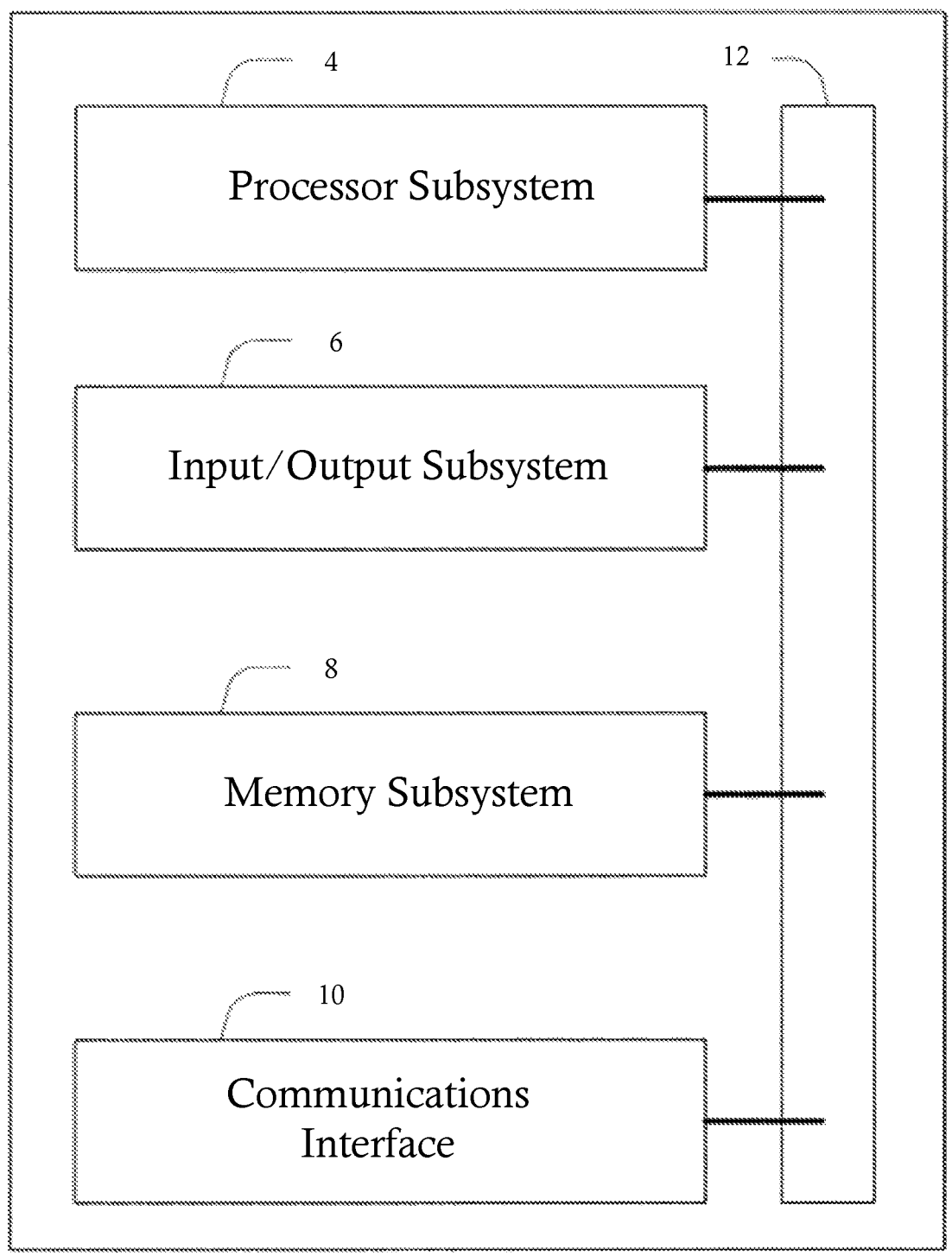
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
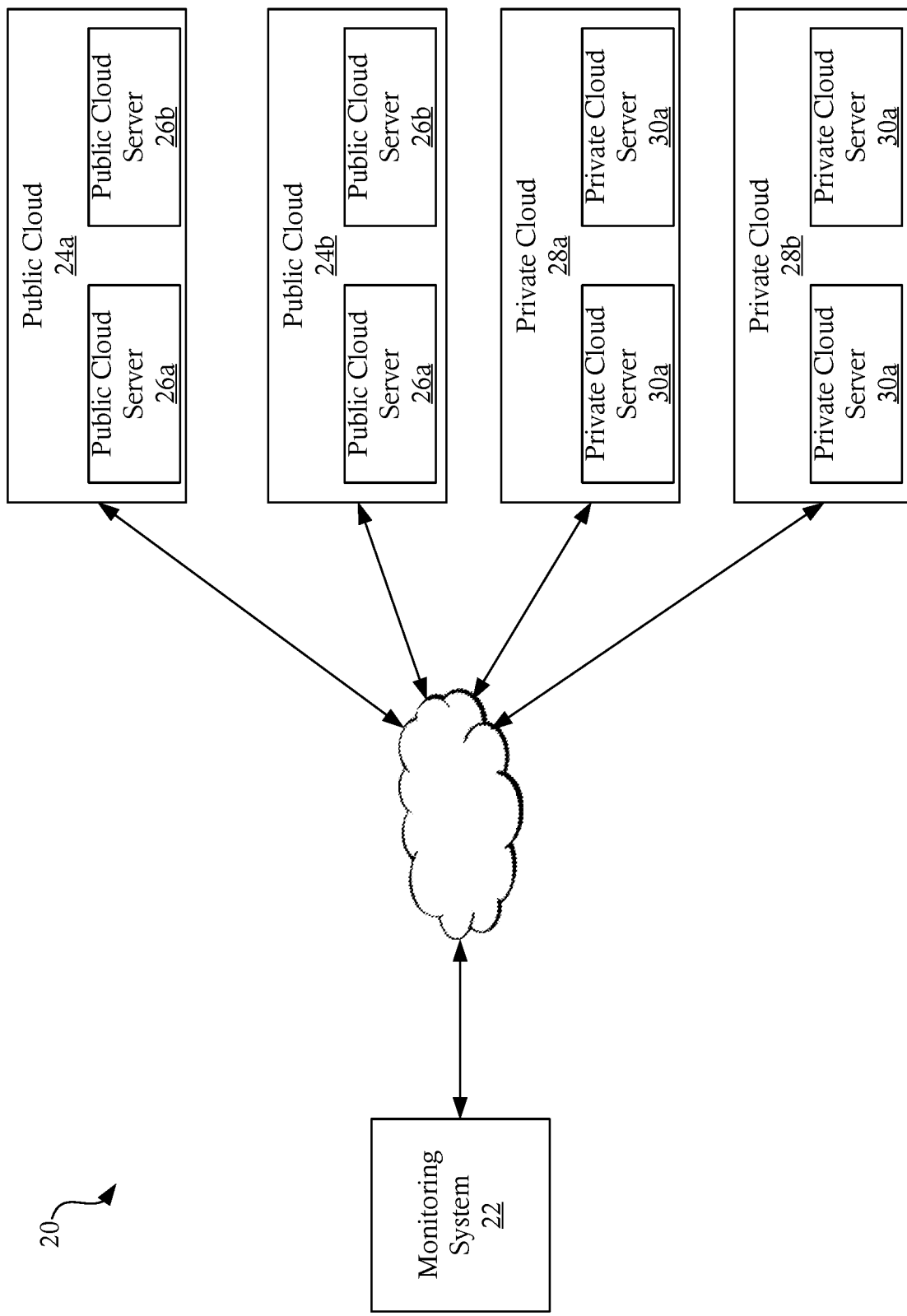
FIG. 2 illustrates a network configured to provide cloud deployment and monitoring of cloud-based applications, in accordance with some embodiments.

FIG. 2 illustrates a network 20 configured to provide cloud deployment and monitoring of cloud-based applications, in accordance with some embodiments. In some embodiments, the network 20 includes at least one monitoring system 22 in signal communication with a plurality of public clouds 24a, 24b (collectively public clouds 24) each including a plurality of public cloud servers 26a, 26b (collectively public cloud servers 26) and a plurality of private clouds 28a. 28b (collectively private clouds 28) each including a plurality of a private cloud servers 30a, 30b (collectively private cloud servers 30). Each of the systems 22, 26a, 26b, 30a, 30b can include a system 2 as described above with respect to FIG. 1, and similar description is not repeated herein. Although the systems are each illustrated as independent systems, it will be appreciated that each of the systems may be combined, separated, and/or integrated into one or more additional systems. For example, in some embodiments, the monitoring system 22 and at least one of the private cloud servers 30 may be implemented by a shared server or shared network system. Similarly, the public cloud servers 26 may be integrated, such as in a single networked system or server.

The monitoring system 22 is configured to monitor each of the public clouds 24 and the private clouds 28 to monitor, review, and correct compliance of the clouds 24, 28 with one or more application requirements, cloud requirements, and/or network requirements for deployment of one or more network applications. In some embodiments, the monitoring system 22 is configured to monitor the availability of one or more services, the distribution of one or more applications, the availability and/or health of one or more servers, and/or any other suitable metrics for determining compliance of an application deployment with one or more deployment requirements.

In various embodiments, each of the clouds 24, 28 include a plurality of cloud servers 26, 30 configured to implement one or more applications, services, and/or other functions. For example, each of the cloud servers 26, 30 can be configured to implement a plurality of applications and associated services. Each deployment of an application, service, and/or cloud 24, 28 may include one or more requirements (or rules) for meeting quality control or uptime requirements, such as, for example, high availability requirements, disaster recovery requirements, and/or other quality control or uptime requirements. Each of the requirements may apply to an individual server 26, 30, clouds 24, 28, and/or the entire networked environment 20. For example, in some embodiments, private clouds may include requirements that each application be deployed to at least two data centers with each data center including at least two servers each running at least one instance of an application to satisfy high availability requirements. As another example, in some embodiments, public clouds may include requirements that each application be deployed to at least two cloud regions with at least three instances in each region to satisfy high availability requirements. It will be appreciated that any suitable rules can be applied for any suitable quality control, uptime, or other requirements.

Figure 3:
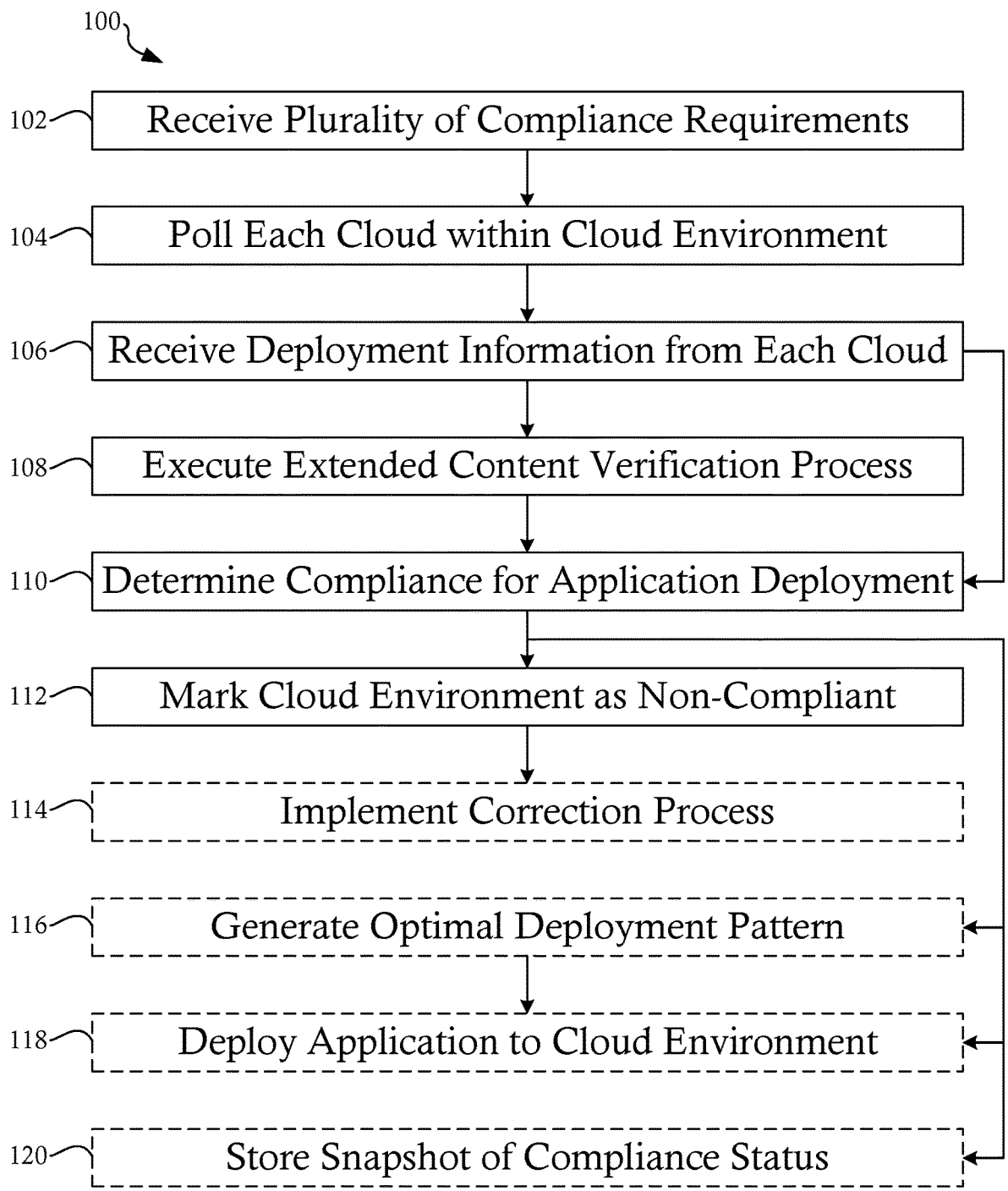
FIG. 3 is a flowchart illustrating a method of verifying high availability and disaster recovery compliance, in accordance with some embodiments.
Figure 4:
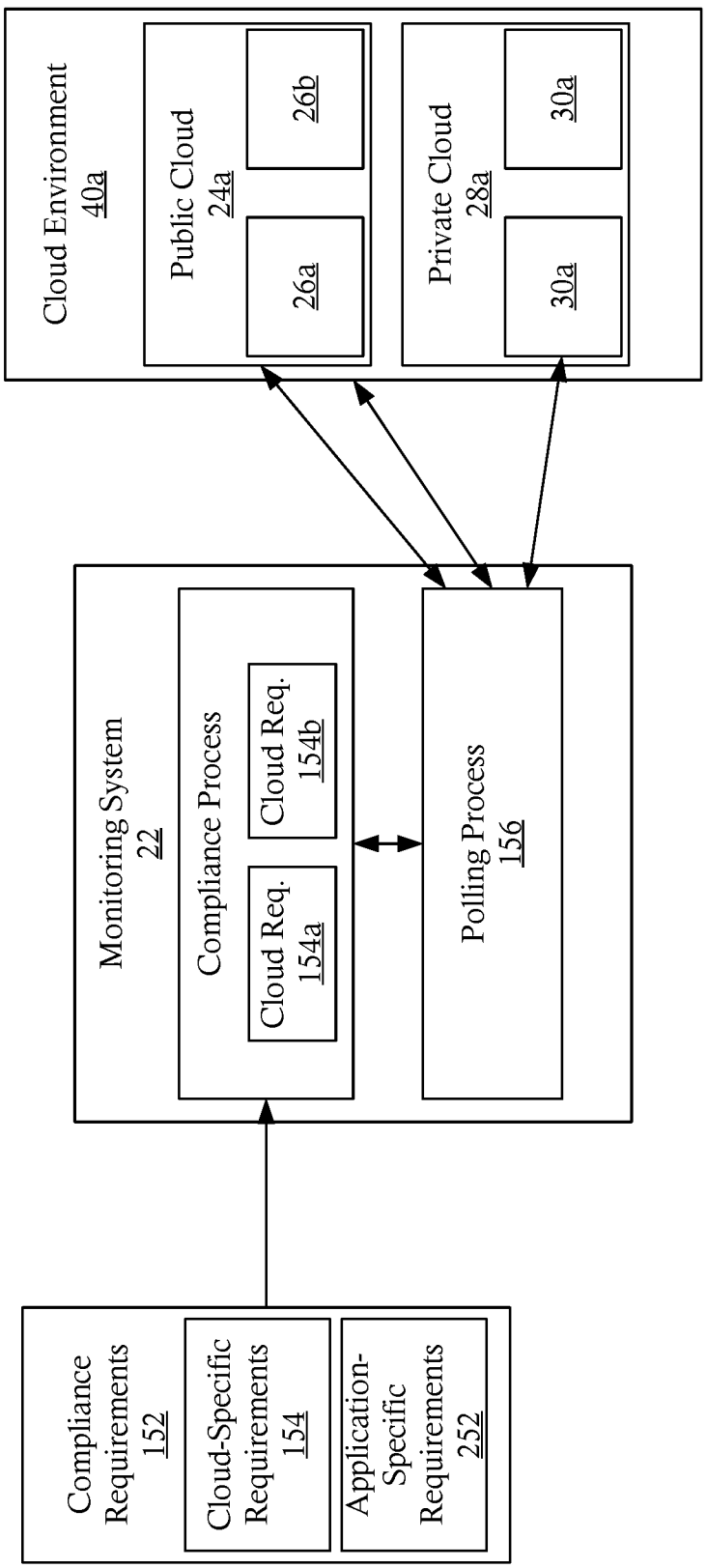
FIG. 4 illustrates various system elements during executing of the method of verifying high availability and disaster recovery compliance illustrated in FIG. 3, in accordance with some embodiments.

FIG. 3 is a flowchart illustrating a method 100 of monitoring and correcting cloud compliance requirements, in accordance with some embodiments. FIG. 4 illustrates various system components during execution of the method 100, in accordance with some embodiments. At step 102, a plurality of compliance requirements 152 are received. The compliance requirements 152 can include any suitable requirements, such as, for example, cloud-specific compliance requirements 154 (e.g., high availability requirements, disaster recovery requirements, etc.), application-specific compliance requirements 252, and/or any other compliance requirements. In some embodiments, the cloud-specific compliance requirements may specify a minimum requirements for general deployment of applications to the cloud environment 40a, such as, for example, a minimum number of data centers, a minimum number of servers, a minimum number of regions, a minimum number of application instances, a minimum uptime requirement for servers and/or clouds, and/or any other suitable compliance requirements. Similarly, in some embodiments, the application-specific compliance requirements 252 may specify minimum application/service requirements for deployment a specific application, such as, for example, availability of support or required applications/services within the cloud environment 40a.

In some embodiments, the cloud-specific requirements 154 for one or more private clouds are different than the compliance requirements for one or more public clouds. For example, in some embodiments, the cloud-specific requirements 154 for a private cloud may include requirements that any application or service be deployed to at least two data centers of the private cloud and be deployed to at least two servers or systems within each data center with at least one deployment per server. In contrast, cloud-specific requirements 154 for a public cloud may include requirements that any applications or services be deployed to at least three geographically diverse regions and include at least two deployments within each region. Although specific examples of cloud-specific requirements 154 are discussed herein, it will be appreciated that any suitable cloud-specific requirements 154 can be received.

In some embodiments, the application-specific compliance requirements 252 are associated with a specific application, service, and/or set of applications and services that have been previously deployed and/or are configured to be deployed to the cloud environment 40a ("target application"). For example, in some embodiments, the application-specific compliance requirements 252 may include requirements for additional deployments or instances to satisfy application-specific high availability and/or disaster recovery requirements. In some embodiments, the application-specific compliance requirements 252 identify a plurality of support applications/services that are required for deployment of the target application.

At step 104, each cloud 24a, 28a within the cloud environment 40a is polled or otherwise reviewed to obtain the current status of the cloud 24a, 24b. For example, in some embodiments, a cloud monitoring system 22 is configured to execute a polling process 156 to request information regarding the status of each public cloud 24a and/or private cloud 28a monitored by the monitoring system 22. The requested information can include, but is not limited to, the status (e.g., availability) of each cloud 24a, 28a and/or server 26, 30 within each cloud 24a, 28a, current software, applications, services, or builds deployed to each cloud 24a, 28a or server 26, 30, the location of each cloud 24a, 28a and/or server 26, 30, the uptime/reliability of each cloud 24a, 28a and/or server 26, 30, and/or any other suitable health or availability information. Each cloud 24a, 28a may provide deployment information 156a, 156b to the monitoring system 22 in response to the polling request.

At step 106, the status information received from each respective cloud 24a, 28a is compared to the compliance requirements 152 to determine whether the cloud environment 40a satisfies the compliance requirements 152. For example, the monitoring system 22 may determine whether each individual cloud 24a, 28a satisfies cloud-specific compliance requirements 154. In some embodiments, and as discussed above, in some embodiments the cloud-specific compliance requirements 154 for a public cloud 24a and a private cloud 28a may be different. The monitoring system 22 is configured to review status information from each cloud 24a, 28a and to determine whether each cloud 24a, 24b meets the compliance requirements 152 applicable to the specific cloud (or cloud type).

For example, in some embodiments, a cloud environment 40a includes a first public cloud 24a and a first a private cloud 28a. The monitoring system 22 polls each of clouds 24a, 28a and/or the servers 26, 30 in the clouds 24a, 28a to obtain a status information for each cloud 24a, 28a that includes, for example, the current number of available servers 26, 30, location of each server 26, 30, availability of each server 26, 30, and/or any other suitable compliance information. The cloud status from the public cloud 24a is compared to a first set of the cloud-specific requirements 154a associated with public clouds (or a subset of public clouds that includes the public cloud 24a) and the status information received from the private cloud 28a is compared to a second set of cloud-specific requirements 154b associated with private clouds (or a subset of private clouds that includes the private cloud 28a).

In some embodiments, the first set of cloud-specific requirements 154a specifies that each public cloud must provide a minimum of two cloud regions with the capability to support three instances of an application within each region (e.g., three servers each supporting one instance, one server supporting three instances, etc.). If the public cloud 24a includes at least two cloud regions each capable of supporting three instances of an application, the public cloud 24a satisfies the first set of cloud-specific requirements 154a. Similarly, in some embodiments, the second set of cloud-specific requirements 154b specifies that each private cloud must provide a minimum of two data centers with two servers within each data center and at least one instance of an application running on each server. If the private cloud 28a includes at least two available data centers each with at least two available servers capable of supporting one instance of an application, the private cloud 28a satisfies the second set of cloud-specific requirements 154b.

In some embodiments, the cloud-specific requirements 154 include one or more cross-cloud requirements, such as, for example, a requirements that a cloud environment 40a include at least one private cloud and at least one public cloud that each meet the applicable set of cloud-specific requirements 154a, 154b. After verifying compliance of each of the individual clouds 24a, 28a, the monitoring system 22 may review a set of environment-level compliance requirements 156 including cross-cloud requirements. For example, in some embodiments, the environment-level compliance requirements 156 may require that a cloud environment 40a include at least one public cloud 24a that satisfies the first set of compliance requirements 156a and at least one private cloud 28a that satisfies the second set of compliance requirements 156b. A cloud-level output indicating compliance/non-compliance with each of the cloud-specific compliance requirements 154 is generated. In some embodiments, the method 100 proceeds to optional step 108.

In some embodiments, the cloud-specific requirements 154 include deployment order and/or deployment scale requirements. For example, in some embodiments, the cloud-specific requirements may include deployment norms such as a deployment order requiring a first cloud to receive a certain number of instances and/or be at a predetermined capacity prior to deploying additional instances to a second cloud.

In some embodiments, the cloud-specific requirements 154 and/or the application-specific requirements 252 include one or more of an auto-scale requirement (e.g., requirements that instances be added on traffic spikes or removed on traffic troughs), auto-repair (e.g., requirements that instances be repaired upon reaching unhealthy states), auto-replace, auto-comply, and/or other requirements.

At optional step 108, an extended content verification process is executed to verify the compliance of applications, services, functions, and/or other required cloud functionality (referred to herein as a "cloud asset") to the application-specific requirements 252. The extended content verification process generates an application-level output indicating compliance/non-compliance of each cloud asset with the application-specific requirements 252. An embodiment of an extended content verification process 114a is discussed in greater detail with respect to FIGS. 5-6. In some embodiments, optional step 108 is omitted and the method proceeds directly to step 110.

At step 110, the cloud-level response generated at step 106 and/or the application-level response generated at step 108 is reviewed to determine whether the cloud environment 40a is configured for deployment of an application. The cloud-level response and/or the application-level response can include a plurality of flags configured to indicate whether a specific compliance requirement is satisfied. The cloud-level response and/or application-level response may include, but are not limited to, an auto repair flag, an auto replace flag, a cloud identifier, a compute identifier, a data center identifier, a disaster recovery flag, an extended content verification flag, an extended content verification instance flag, an environment identifier, an environment compliance flag, a high-availability flag, a disaster-recovery flag, and/or application/service specific flags. Each flag may be set by applying one or more cloud-specific requirements 154 and/or application-specific requirements 252. The flags are reviewed to determine if the cloud environment 40a is configured for deployment of an application. For example, deployment of an application may require a high-availability flag and one or more application specific flags to be set to true (e.g., the cloud environment 40a complies with these requirements) while other flags may be set to false (e.g., disaster recovery flag if disaster recovery is not required for application deployment). If the cloud environment 40a is compliant, the method 100 proceeds to one of step 114-120 as described in greater detail below. Otherwise, the method proceeds to step 112.

At step 112, the cloud environment 40a is marked as failing to comply with at least one compliance requirement 152. In some embodiments, the monitoring system 22 is configured to identify which compliance requirement(s) 152 are not met. For example, to continue the above examples, if only a single data center is active within the private cloud 24a, the cloud environment 40a is marked as non-compliant and the monitoring system 22 identifies the private cloud 24a, and more specifically, the lack of a two-data center deployment within the private cloud 24a, as the reason for the non-compliance. Similarly, if a required cloud asset is not available (e.g., failed the extended content verification process at step 108), the cloud environment 40a is marked non-compliant and the monitoring system 22 identifies the specific cloud-asset as the reason for the non-compliance. If multiple points of non-compliance are identified, the monitoring system 22 may identify each failure point.

At optional step 114, the monitoring system 22 implements one or more processes to correct the non-compliance of the cloud environment 40a. For example, if the cloud environment 40a fails to meet one or more cloud-specific requirements 154, the monitoring system 22 may implement a process to deploy (or access) additional data centers, cloud regions, servers, clouds, etc. to satisfy the cloud-specific requirements 154. Similarly, if a cloud asset is not available, the monitoring system 22 may implement an application correction process (as discussed in detail with respect to FIGS. 5-6) to correct the application-specific non-compliance. It will be appreciated that the type of action taken by the monitoring system 22 will be dependent on the non-compliance condition identified by the monitoring system 22 at step 112.

At optional step 116, the cloud environment 40a is reviewed to generate an optimal and/or suggested application deployment. For example, in some embodiments, the monitoring system 22 identifies optimal data centers, clouds, servers, etc. for deployment of an application. Optimization may be based on providing high responsiveness and throughput, low latency, and/or other optimization or performance metrics. The monitoring system 22 may identify multiple potential deployments based on optimization rules, compliance rules, and/or any other applicable optimization processes. In some embodiments, the optimization rules include existing deployment structure and capacity constraints, specific approved deployment patterns based on group membership (e.g., specific divisions, groups, employees, etc.), and/or any other suitable optimization rules to provide optimal utilization of the cloud environment.

At optional step 118, an application is deployed to the cloud environment 40a. Deployment of an application may be limited such that deployment occurs only when the cloud environment 40a is marked as satisfying all compliance requirements 152 at step 110. The deployment pattern may be based on an optimized deployment pattern determined at step 116 and/or may be a user specified, default, and/or other deployment pattern.

At optional step 120, a snapshot of the compliance status of the cloud environment 40a is generated and stored. For example, in some embodiments, the cloud-level response and/or the application-level response received at steps 104 and 106 is stored in memory of the monitoring system 22 and/or a cloud computer in signal communication with the monitoring system 22. In some embodiments, a plurality of snapshots may be stored at predetermined intervals and/or on a predetermined schedule to provide a historical view and/or trend of the health or availability of an application to provide information regarding production readiness of an application, cloud environment 40a, and/or other historical information. In some embodiments, the snapshots are configured to provide a health check and/or review of deployed applications and services within the cloud environment 40a.

Figure 5:
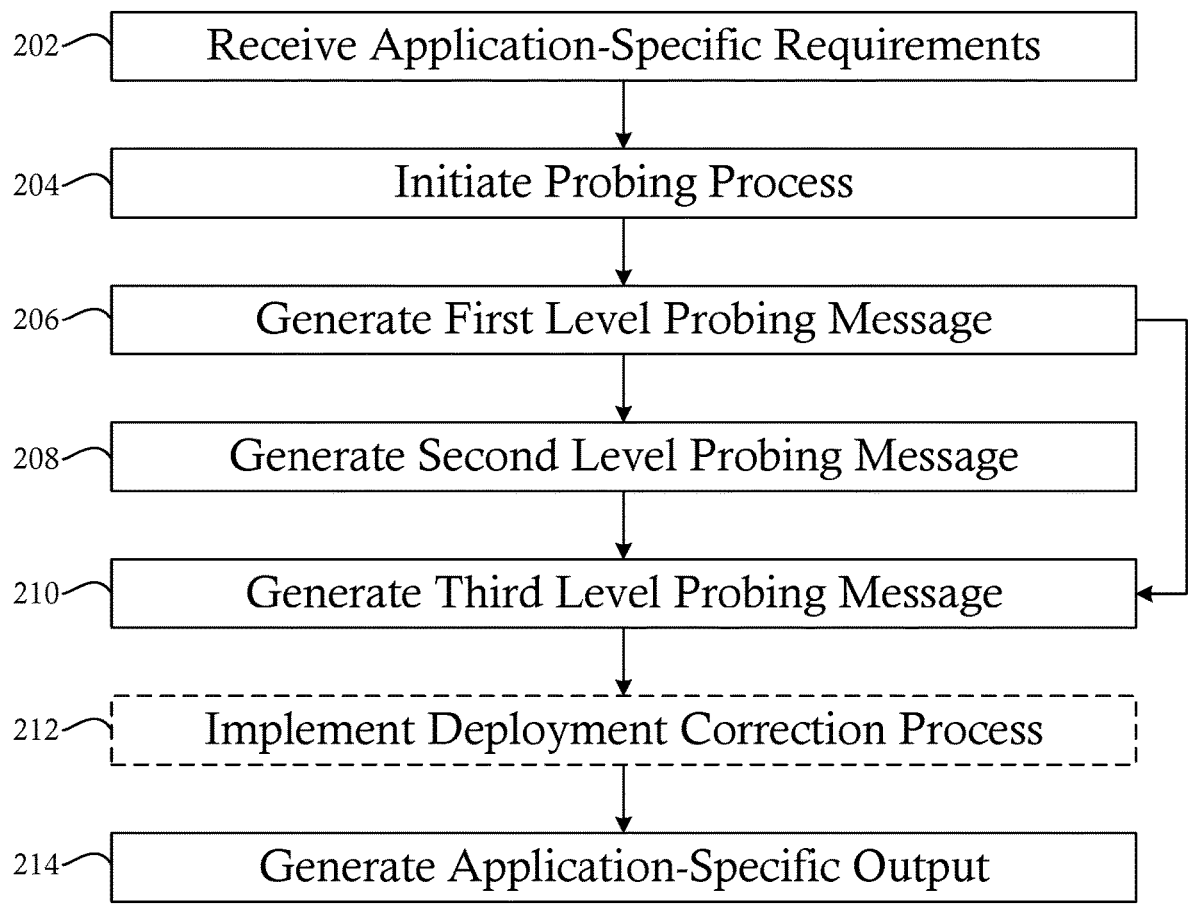
FIG. 5 is a flowchart illustrating a method of extended content verification in a hybrid cloud environment, in accordance with some embodiments.
Figure 6:
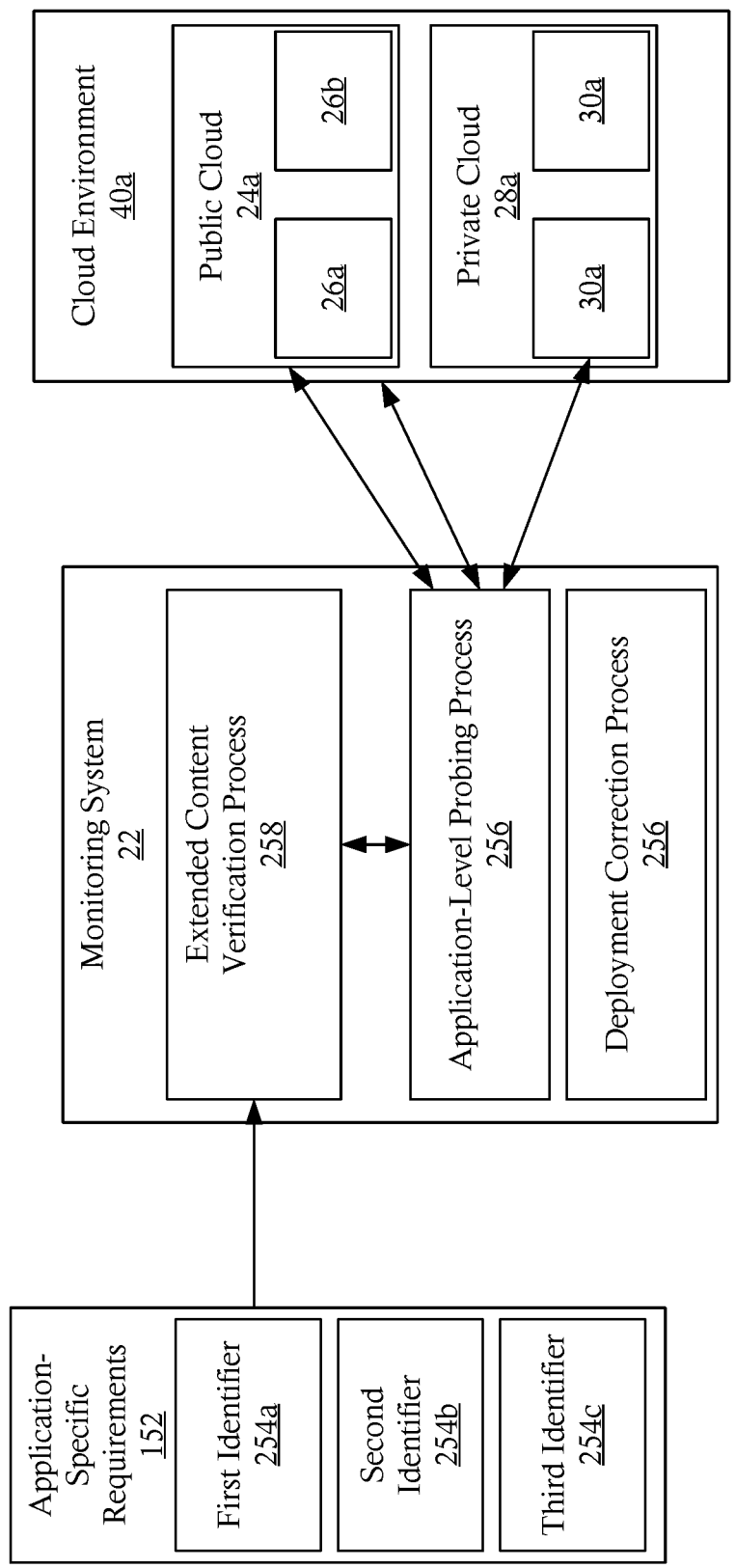
FIG. 6 illustrates various system elements during the execution of the method of extended content verification illustrated in FIG. 5, in accordance with some embodiments.

FIG. 5 is a flowchart illustrating a method 110a of extended content verification, in accordance with some embodiments. FIG. 6 illustrates various system components during execution of the method 110a, in accordance with some embodiments. At step 202, application requirements 252 for a specific application are received. The application requirements 252 can include a plurality of identifiers 254a-254c each associated with an application, service, or other cloud function that is required for deployment of the application. In some embodiments, one or more of the plurality of identifiers 254a-254c are associated with applications/services that are critical for a load balancing deployment of the target application. The application requirements 252 may be received by any suitable system, such as, for example, the monitoring system 22.

At step 204, an application level probing process 256 is initiated for the service associated with each of the plurality of service identifiers 254a-254c. In some embodiments, the probing process 256 is configured to generate one or more probing messages for the service associated with each of the plurality of service identifiers 254a-254c. If a response is received from a service within a predetermined time period, the service is considered active. If a response is not received from the service within the predetermine time period, the service is considered unavailable (e.g., down). The predetermined time period may be any suitable time period, such as, for example, any time period between about 2 seconds to about 10 seconds. In some embodiments, the probing process 256 includes a plurality of sub-steps 206-210 that may be optionally executed to probe each application identified by the plurality of service identifiers 254a-254c.

At step 206, a first level probing message is generated to identify availability of an application within the cloud environment. If the application is currently reachable on any instance within the cloud environment, the probing process 256 will receive a first level response message from the application. The first level probing message identifies the general availability at an application level for a specific application, service, etc. within the cloud environment.

At step 208, a second level probing message is generated and provided to a specific cloud 24a, 28a within the cloud environment 40a. The second level probing message is configured to test whether traffic to the selected cloud 24a, 28a is being appropriately directed, e.g., is arriving at the application/service within the selected cloud 24a, 28a. At step 210, a third level probing message is generated and provided to one or more instance of the application/service within a selected cloud 24a, 28a. The third level probing message is configured to test the selected individual instances to determine whether each instance is reachable/unreachable, healthy/unhealthy, etc.

In some embodiments, an extended content verification process 258 is configured to receive probing responses from the application-level probing process 256 and verify the availability of an application/service. If each level of probing messages receives a predetermined number of valid responses, the application/services are marked responsive and the method 110a proceeds to step 214. For example, in some embodiments, a single response may be required to a first level probing message and a second level probing message for an application/service to be marked responsive but a response to two or more third level probing messages may be required. If the predetermined number of responses is not received to any one of the probing messages, the application/service is marked unresponsive, and the method 110a proceeds to optional step 212.

At optional step 212, a deployment correction process 260 is implemented to correct one or more errors identified by the extended content verification process 258. For example, in some embodiments, if an application/service was marked unresponsive at step 206, the deployment correction process 260 may initiate an application/service deployment process to re-deploy the unresponsive application/service to the cloud environment 40a. Similarly, if an application/service was marked unresponsive at step 208, the correction process 260 may initiate a load-balancing process to redistribute a load within a specific cloud 24a, 28b. As yet another example, if an application/service was marked unresponsive at step 210, the correction process 260 may deploy one or more additional instances of the application/service within the selected cloud 24a, 28a. It will be appreciated that the corrective actions taken at step 212 may be any suitable actions to correct the deficiency identified during the probing process 256. After implementing the correction process

260, the method 110*a* may return to step 204 to re-execute the probing process 256 to verify availability/health of the application/service.

At step 214, an output indicating whether the application requirements 252 are satisfied is generated. In some embodiments, the output is used in additional steps of the method 100 as discussed in detail above. For example, in some embodiments, the method 100 deploys an application at step 118 only if all application requirements 252 are marked as satisfied by the method 110*a*. In other embodiments, the output is provided to a user for review, verification, correction, etc. The output may be displayed to a user and/or otherwise communicated to a user.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
  a non-transitory memory having instructions stored thereon, and a processor configured to read the instructions to:
  receive a set of compliance requirements including one or more required-asset identifiers and a set of minimum deployment requirements for each required-asset identifier, wherein each of the one or more required-asset identifiers are associated with a cloud asset required for deployment of a target application, wherein the set of compliance requirements include a first set of compliance requirements for a private cloud and a second set of compliance requirements for a public cloud, and wherein the first set of compliance requirements and the second set of compliance requirements are different;
  generate one or more first level probing messages to determine an availability of a respective cloud asset associated with the one or more required-asset identifiers within a cloud environment;
  receive at least one first level probing response from at least one cloud within the cloud environment;
  in response to the at least one first level probing response indicating that the respective cloud asset is available, wherein the respective cloud asset is a first cloud asset when the at least one cloud is the public cloud and a second cloud asset when the at least one cloud is the private cloud:
    generate one or more second level probing messages to determine whether traffic to the at least one cloud is arriving at an application of the respective cloud asset within the at least one cloud;
    receive at least one second level probing response from the at least one cloud within the cloud environment in response to the one or more second level probing messages, the at least one second level probing response indicates that the traffic to the at least one cloud is arriving at the application of the respective cloud asset within the at least one cloud;
    in response to receiving the at least one second level probing response from the at least one cloud, identify the cloud environment as one of compliant or non-compliant for application deployment, wherein the cloud environment is identified as compliant when each cloud asset meets the set of minimum deployment requirements and non-compliant when at least one cloud asset fails to meet at least one of the set of minimum deployment requirements;
  deploy the target application to the cloud environment when the cloud environment is identified as compliant; and
  implement a correction process to deploy at least one instance of at least one cloud asset to correct the cloud environment when the cloud environment is identified as non-compliant.

2. The system of claim 1, wherein generating the one or more first level probing messages comprises generating a probing message configured to identify availability of a first cloud asset associated with a first one of the one or more required-asset identifiers on any cloud within the cloud environment.

3. The system of claim 1, wherein generating the one or more first level probing messages comprises generating a plurality of probing messages configured to identify a load-balancing status of a first cloud asset within a selected cloud in the cloud environment.

4. The system of claim 1, wherein generating the one or more second level probing messages comprises generating a plurality of probing messages configured to identify a status of one or more specific instances of a first cloud asset within a selected cloud in the cloud environment.

5. The system of claim 1, wherein the set of minimum deployment requirements include a high-availability requirement, a disaster recovery requirement, or a combination thereof.

6. The system of claim 1, wherein the set of minimum deployment requirements includes at least one load-balancing requirement.

7. A non-transitory computer readable medium having instructions stored thereon, wherein the instructions, when executed by a processor cause a device to perform operations comprising:
  receiving a set of compliance requirements including one or more required-asset identifiers and a set of minimum deployment requirements for each required-asset identifier, wherein each of the one or more required-asset identifiers are associated with a cloud asset required for deployment of a target application, wherein the set of compliance requirements include a first set of compliance requirements for a private cloud and a second set of compliance requirements for a public cloud, and wherein the first set of compliance requirements and the second set of compliance requirements are different;
  generating one or more first level probing messages to determine an availability of a respective cloud asset associated with the one or more required-asset identifiers within a cloud environment, wherein the respective cloud asset is a first cloud asset when the at least one cloud is a public cloud and the second cloud asset when the at least one cloud is the private cloud;
  receiving at least one first level probing response from at least one cloud within the cloud environment;
  in response to the at least one first level probing response indicating that the respective cloud asset is available:

generating one or more second level probing messages to determine whether traffic to the at least one cloud is arriving at an application of the respective cloud asset within the at least one cloud;

receiving at least one second level probing response from the at least one cloud within the cloud environment in response to the one or more second level probing messages, the at least one second level probing response indicates that the traffic to the at least one cloud is arriving at the application of the respective cloud asset within the at least one cloud;

in response to receiving the at least one second level probing response from the at least one cloud, identifying the cloud environment as one of compliant or non-compliant for application deployment, wherein the cloud environment is identified as compliant when each cloud asset meets the set of minimum deployment requirements and non-compliant when at least one cloud asset fails to meet at least one of the set of minimum deployment requirements;

deploying the target application to the cloud environment when the cloud environment is identified as compliant; and implementing a correction process to deploy at least one instance of at least one cloud asset to correct the cloud environment when the cloud environment is identified as non-compliant.

8. The non-transitory computer readable medium of claim 7, wherein generating the one or more first level probing messages comprises generating a probing message configured to identify availability of a first cloud asset associated with a first one of the one or more required-asset identifiers on any cloud within the cloud environment.

9. The non-transitory computer readable medium of claim 7, wherein generating the one or more first level probing messages comprises generating a plurality of probing messages configured to identify a load-balancing status of a first cloud asset within a selected cloud in the cloud environment.

10. The non-transitory computer readable medium of claim 7, wherein generating the one or more second probing messages comprises generating a plurality of probing messages configured to identify a status of a one or more specific instances of a first cloud asset within a selected cloud in the cloud environment.

11. The non-transitory computer readable medium of claim 7, wherein the set of minimum deployment requirements include a high-availability requirement, a disaster recovery requirement, or a combination thereof.

12. The non-transitory computer readable medium of claim 7, wherein the set of minimum deployment requirements includes at least one load-balancing requirement.

13. A method, comprising:
receiving a set of compliance requirements including one or more required-asset identifiers and a set of minimum deployment requirements for each required-asset identifier, wherein each of the one or more required-asset identifiers are associated with a cloud asset required for deployment of a target application, wherein the set of compliance requirements include a first set of compliance requirements for a private cloud and a second set of compliance requirements for a public cloud, and wherein the first set of compliance requirements and the second set of compliance requirements are different;

generating one or more first level probing messages to determine an availability of a respective cloud asset associated with the one or more required-asset identifiers within a cloud environment, wherein the respective cloud asset is a first cloud asset when the at least one cloud is the public cloud and a second cloud asset when the at least one cloud is the private cloud;

receiving at least one first level probing response from at least one cloud within the cloud environment;

in response to the at least one first level probing response indicating that the respective cloud asset is available:
generating one or more second level probing messages to determine whether traffic to the at least one cloud is arriving at an application of the respective cloud asset within the at least one cloud;

receiving at least one second level probing response from the at least one cloud within the cloud environment in response to the one or more second level probing messages, the at least one second level probing response indicates that the traffic to the at least one cloud is arriving at the application of the respective cloud asset within the at least one cloud;

in response to receiving the at least one second level probing response from the at least one cloud, identifying the cloud environment as one of compliant or non-compliant for application deployment, wherein the cloud environment is identified as compliant when each cloud asset meets the set of minimum deployment requirements and non-compliant when at least one cloud asset fails to meet at least one of the set of minimum deployment requirements;

deploying the target application to the cloud environment when the cloud environment is identified as compliant; and implementing a correction process to deploy at least one instance of at least one cloud asset to correct the cloud environment when the cloud environment is identified as non-compliant.

14. The method of claim 13, wherein generating the one or more first level probing messages comprises generating a probing message configured to identify availability of a first cloud asset associated with a first one of the one or more required-asset identifiers on any cloud within the cloud environment.

15. The method of claim 13, wherein generating the one or more first level probing messages comprises generating a plurality of probing messages configured to identify a load-balancing status of a first cloud asset within a selected cloud in the cloud environment.

16. The method of claim 13, wherein generating the one or more second level probing messages comprises generating a plurality of probing messages configured to identify a status of a one or more specific instances of a first cloud asset within a selected cloud in the cloud environment.

17. The method of claim 13, wherein the set of minimum deployment requirements include a high-availability requirement, a disaster recovery requirement, or a combination thereof.

* * * * *